United States Patent
Bhaumik et al.

(10) Patent No.: US 7,496,815 B2
(45) Date of Patent: Feb. 24, 2009

(54) METHOD AND APPARATUS FOR AUTOMATIC GENERATION OF SYSTEM TEST LIBRARIES

(75) Inventors: Bhaskar Bhaumik, Fremont, CA (US); Dinesh Goradia, Fremont, CA (US); Manoj Betawar, Fremont, CA (US)

(73) Assignee: Sapphire Infotech, Inc., Fremont, CA (US)

( * ) Notice: Subject to any disclaimer, the term of this patent is extended or adjusted under 35 U.S.C. 154(b) by 379 days.

(21) Appl. No.: 11/368,916

(22) Filed: Mar. 6, 2006

(65) Prior Publication Data

US 2007/0220392 A1    Sep. 20, 2007

(51) Int. Cl.
*G01R 31/28* (2006.01)

(52) U.S. Cl. ............... 714/724; 714/4; 714/25; 714/43; 714/713; 714/735; 714/742; 717/163; 717/171; 717/176

(58) Field of Classification Search ............... None
See application file for complete search history.

(56) References Cited

U.S. PATENT DOCUMENTS

| | | | | |
|---|---|---|---|---|
| 5,854,889 | A * | 12/1998 | Liese et al. | 714/43 |
| 6,158,031 | A * | 12/2000 | Mack et al. | 714/724 |
| 6,654,911 | B1 * | 11/2003 | Miles | 714/38 |
| 6,892,154 | B1 * | 5/2005 | Lee | 702/108 |
| 7,010,782 | B2 * | 3/2006 | Narayan et al. | 717/124 |
| 7,055,138 | B2 | 5/2006 | Sutton | |
| 7,237,161 | B2 | 6/2007 | Volz | |
| 7,284,177 | B2 | 10/2007 | Hollander et al. | |
| 2002/0162059 | A1 | 10/2002 | McNeely et al. | |
| 2003/0191590 | A1 | 10/2003 | Narayan et al. | |
| 2003/0208616 | A1 * | 11/2003 | Laing et al. | 709/236 |
| 2004/0073890 | A1 * | 4/2004 | Johnson et al. | 717/124 |
| 2004/0205406 | A1 * | 10/2004 | Kaliappan et al. | 714/31 |
| 2007/0208984 | A1 | 9/2007 | Hayhow et al. | |
| 2007/0220392 | A1 | 9/2007 | Bhaumik et al. | |
| 2007/0245198 | A1 | 10/2007 | Betawar et al. | |

OTHER PUBLICATIONS

TestSmart technical/marketing manual published on Internet.

* cited by examiner

*Primary Examiner*—John P Trimmings
(74) *Attorney, Agent, or Firm*—Oblon, Spivak, McClelland, Maier & Neustadt, P.C.

(57) ABSTRACT

An apparatus and associated methodology are provided to generate system test libraries for solution testing involving heterogeneous devices from different vendors. A unified user interface employs received information to execute the tests based on provided device and network topology libraries, generating the system library to perform the required end-to-end system testing. The unified user interface and the library generation mechanism provide a layer of abstraction avoiding complexities of the system configuration commands native to disparate devices.

15 Claims, 9 Drawing Sheets

Device Library

METHOD AND APPARATUS FOR AUTOMATIC GENERATION OF SYSTEM TEST LIBRARIES

BACKGROUND

1. Field of the Invention

This invention relates generally to the field of testing a system or a solution. More particularly, the invention relates to automatically generating system test libraries for testing an end-to-end solution consisting of one or more devices in a heterogeneous system consisting of devices of different types.

2. Background and Description of the Related Art

Testing a system consisting of a network topology of devices can be challenging, because the tests can be dependent upon the individual devices 108 as well as the overall topology chosen. There is a need for a general solution to the problem of generating system test libraries to enable testing of the devices within a given topology by providing a layer of abstraction for device specific command and automating the system library generation so that any change in the device parameters or parameter values may be handled effortlessly.

As devices under test are manufactured by various manufacturers, a standard has been developed for such management agents and management information databases. For example, the Simple Networking Management Protocol (SNMP) is a protocol used for network management of various network devices. SNMP also includes a set of commands that are understood by the network devices. High-level commands (SNMP) can be sent from console to agents. These SNMP commands include commands to set configuration and testing parameters, to set operating values or limits in a device, and to perform some task, such as to notify the console when a particular event occurs and such as a limit being exceeded. However, non-SNMP compliant devices (the devices which provide Command Line Interface (CLI)/Shell Level commands interfaces etc.) may not provide same or similar set of standard commands. Therefore, there is a need for an abstraction layer of commands to isolate the testing framework from the actual command implementations for a particular task to be performed. A mapping of abstract and actual commands may be stored in the testing framework and this mapping is used for command translation at the time of the execution of the system or solution tests.

The network administrator can also manually enter SNMP/CLI/Shell Level commands using a CLI on console.

A device could be tested prior to its productive use by inserting it into a testing framework at the test facility. The test engineer can manually enter SNMP/CLI/Shell Level commands from a console to test operating of the device. These commands could be saved into a script file that is later replayed for each new device or a group of devices inserted into the testing framework. However, manual testing can be tedious and prone to errors. Each new device tested has a different range of parameters or attributes assigned to it, therefore, the script files have to be edited to add/update the device-specific parameters or attributes and their values for each device under test (DUT).

FIG. 1a illustrates the prior art. The prior art includes a written test plan 101 containing one or more test suites 102 which contain one or more test cases 103. Device Interface Logic 104 known to the test case designer helps to determine how to execute the test. The test bed 105 consists of a unified user interface 106 that executes tests 107 against a known DUT 108.

As illustrated in FIG. 1b, in a network test, the test script executed by a user requires knowledge of the actual device specific commands 109 for each DUT 108, including syntax, format and address information. The device generates a response 110 when a command is executed.

Service providers/large enterprises usually provide solutions/services employing systems comprising different types of devices from multiple vendors. Because of disparate device commands and responses, it is a challenge in testing the entire network solution. This is true even if each vendor provides its own test suite (device library) for testing its components. There are solutions today that try to overcome this problem by providing a mechanism for performing end-to-end testing using vendor-supplied device libraries. The drawback to this approach is that the user interface and configuration of each vendor's solution is different. Developing system libraries for a service provider deploying hundreds of different products from different vendors can be difficult.

Existing testing products do not provide for a unified user interface to manage and enable testing of different products from multiple vendors. This forces users to learn new interfaces for each product (a device or a system of devices), making testing less efficient and more error-prone.

This invention provides a testing framework that automatically generates series of test commands (i.e. system test library) for the devices under test for given topologies and testing scenario by reading various configurations, inputs, and device characteristics.

SUMMARY

A framework providing automatically generated test libraries for testing a system comprising heterogeneous devices from different vendors. The framework provides a unified user interface to handle heterogeneous testing products from different vendors such that a user is able to select from a definable set of topologies and supporting devices. A user interface is provided to guide the user in selecting and supplying the required configuration information for devices with respect to a selected topology. The user interface provides trigger points in multiple layers based on the selected topology, test scenario, device or devices under test, and information provided by the user. A trigger point is a set of application programming interfaces (API) consisting of actions which are mapped to a set of device-dependant set of commands (ex. CLI commands for the device). The layers should be a topology, part of a topology, device or function within a device.

BRIEF DESCRIPTION OF THE DRAWINGS

A better understanding of the present invention can be obtained from the following detailed description in conjunction with the following drawings, in which.

The figures are provided in order to provide a thorough understanding of the present invention. The figures should not be construed as limiting the breath of the invention in any manner.

DETAILED DESCRIPTION OF PREFERRED EMBODIMENTS

Described below is a system and method for automatically generating system test libraries and providing a unified user interface for testing an end-to-end solution or a system comprising devices under test. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Embodiments of an Automatic System Test Library Generator

Figure 4:
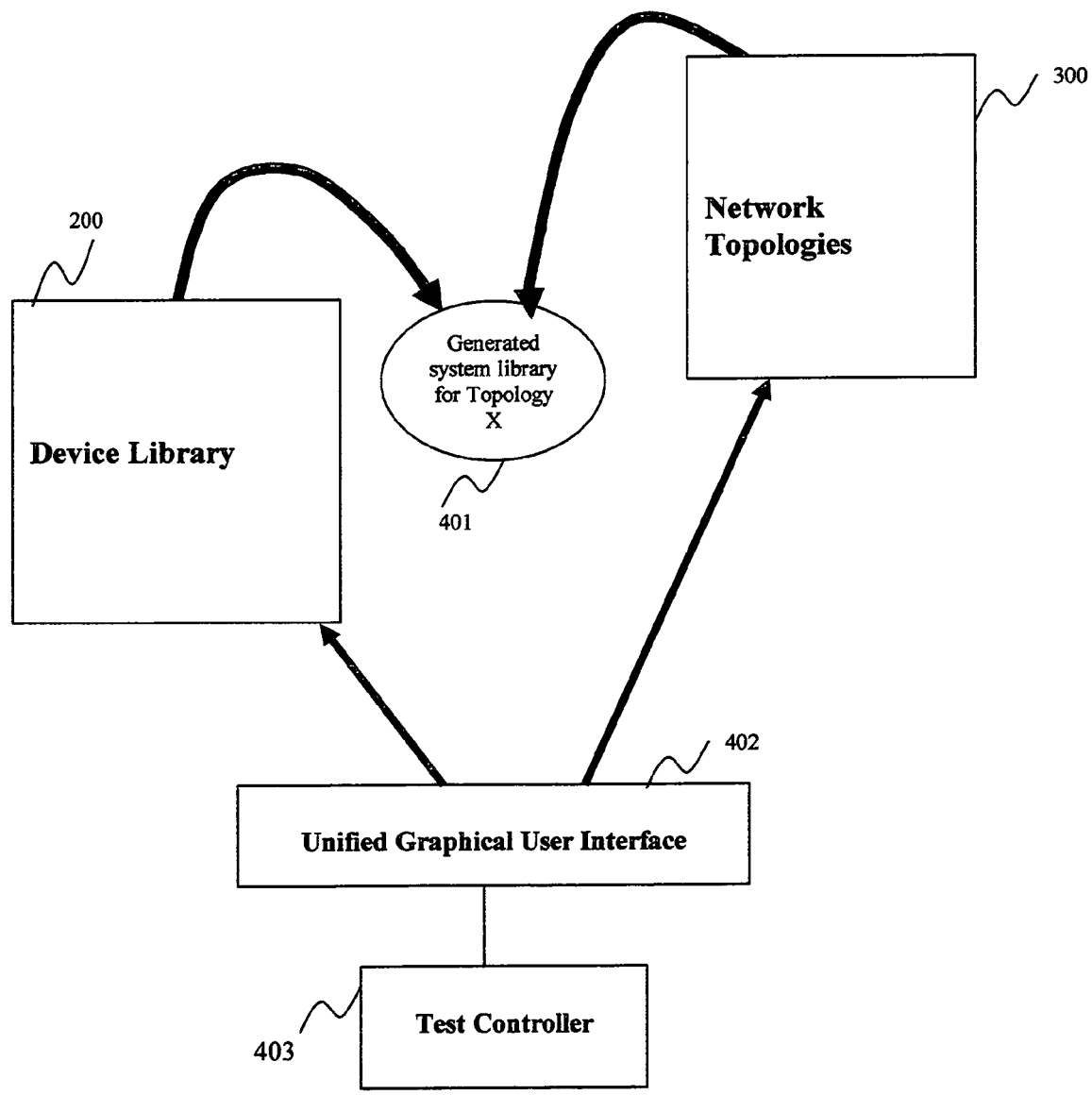
FIG. 4 illustrates a broad overview of a system test library generation process.

As illustrated in FIG. 4, one embodiment of an automatic system library generation process provides a unified user interface 402, which can use the information, such as a network topology, device library, interface addresses, signaling protocols, dial plans, and other required parameters, provided by the user and generate the necessary system test libraries to perform the required testing of an end-to-end solution or a system comprising a device or devices under test under a selected test scenario.

A DUT, as being referred to in this document may be a single device or a system comprising several devices.

Figure 1A:
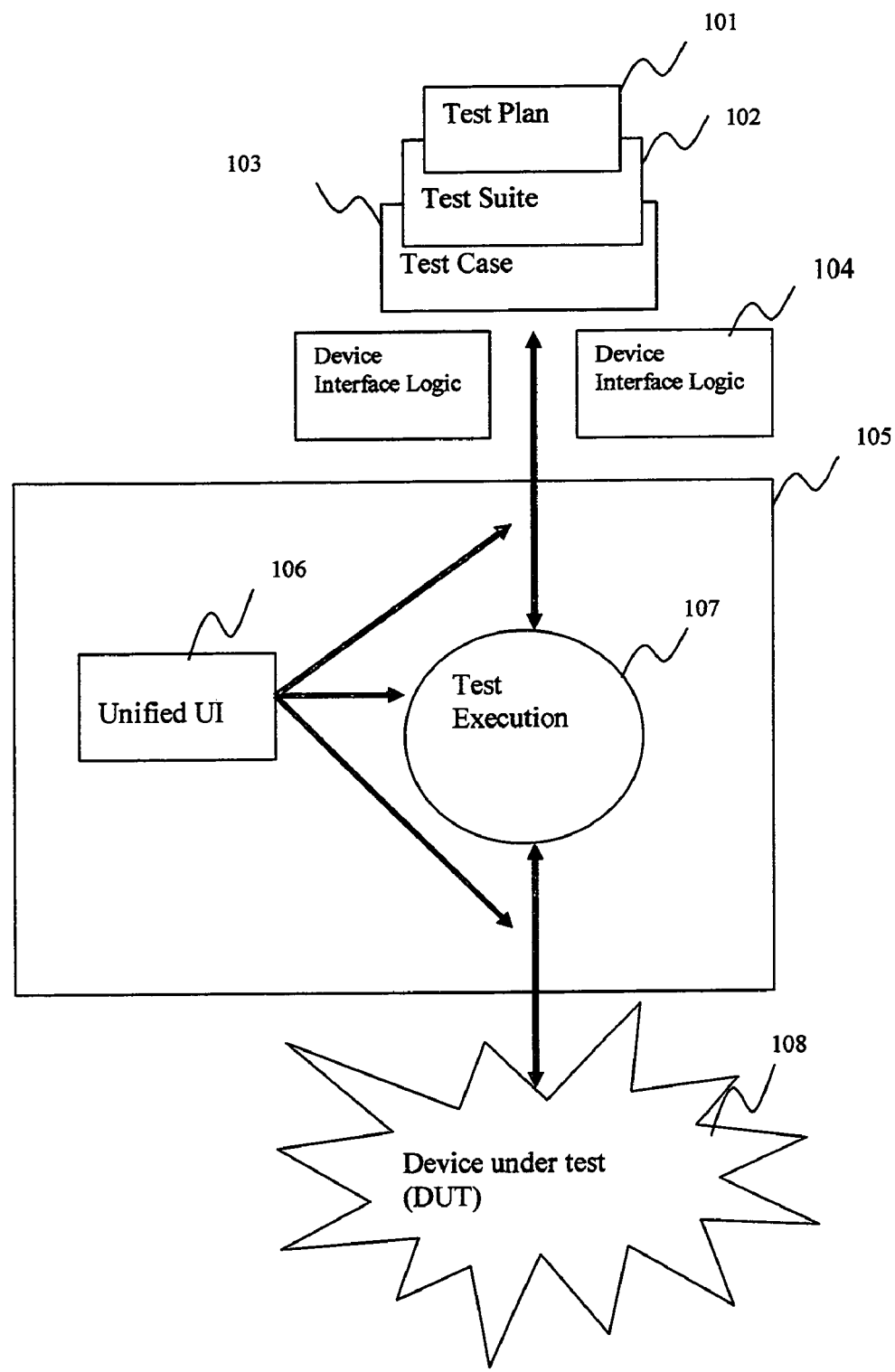
FIG. 1a illustrates a generic interface for testing an end-to-end solution using device libraries provided by a vendor of the solution.
Figure 1B:
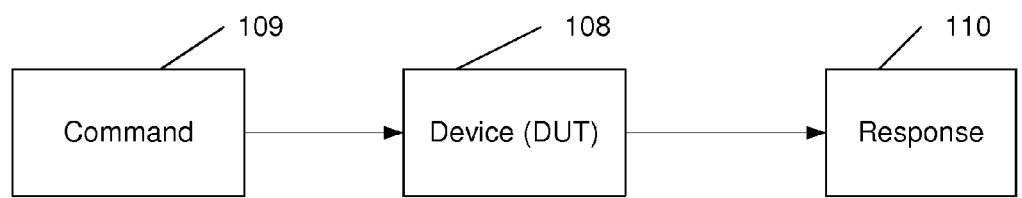
FIG. 1b illustrates the way testing works in the prior art.
Figure 1C:
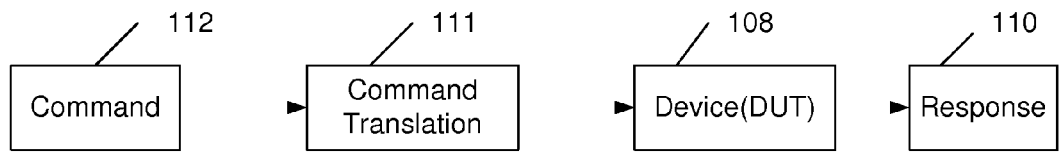
FIG. 1c illustrates the way where a user creates system test libraries using abstract commands 112.

As illustrated in FIG. 1c, a system test library comprising abstract commands 112 can be used for device or system testing. These abstract commands are not device specific. The command is passed through a command translator 111 to the device 108. The command translator is aware of different configurations and the command set of the device 108. The device generates a response 110 when a command is executed.

This embodiment defines a framework for a unified user interface to generate system test libraries for a single or a group of devices coupled together in a particular configuration. A user interacts with the unified user interface, which is used as a central interface with different devices under test, thereby reducing the time and effort in learning different vendor's products FIG. 5a. All required information about each supported device and testing scenarios is preconfigured in the framework to obviate a need for the user to learn the specifics of these devices. The unified user interface provides simplified system configuration and an extensible design to accommodate new testing scenarios for the devices.

Every DUT provides a device and vendor specific set of commands (such as dial-peer, ping, call etc.), and a set of attributes or parameters (such as IP address, port number etc. if it is a network device). These commands are used to instruct the device under test to perform a certain task and to elicit a response under a certain test scenario.

Figure 2A:
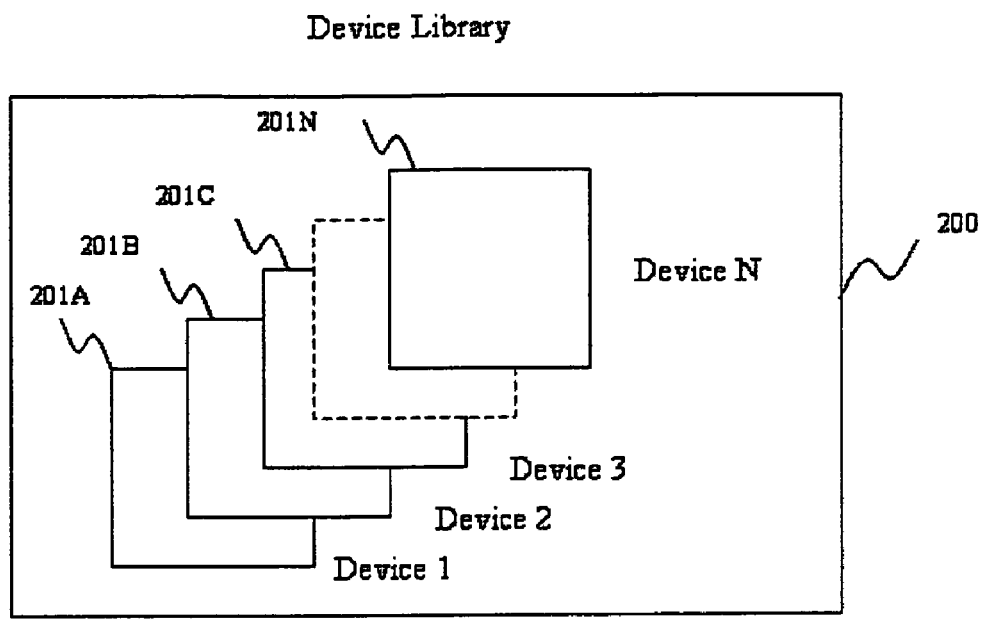
FIG. 2a illustrates a device library that contains basic configuration and attributes/parameters information for each supported device. A system test library can only be generated for a supported device wherein the information of this device is present in the device library.

For each DUT, a basic configuration is captured in the device library 200 as illustrated in FIG. 2a. There is a separate segment containing the basic configuration or attribute/parameter information for each device in the device library. The device library may contain multiple segments, each corresponding to a different version of the control software of the device, for the same device.

Figure 2B:
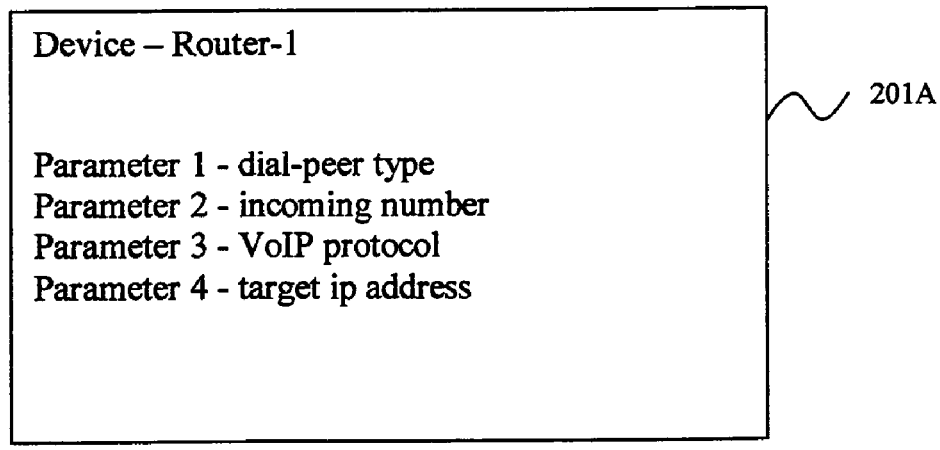
FIG. 2b illustrates a sample configuration for a device contained in the device library.

The device library 200 contains a set of blocks 201A, 201B, 201C . . . 201N of information. Each block, as illustrated in FIG. 2b contains a set of attribute names (such as IP Address, port, enabled ports, disabled ports etc. in case of a network device) for a specific DUT. The set of attributes/parameters could be different for different devices. The user, interacting with the system through the unified user interface, provides values for these attributes during the process of generating a system test library for the DUT.

Figure 3A:
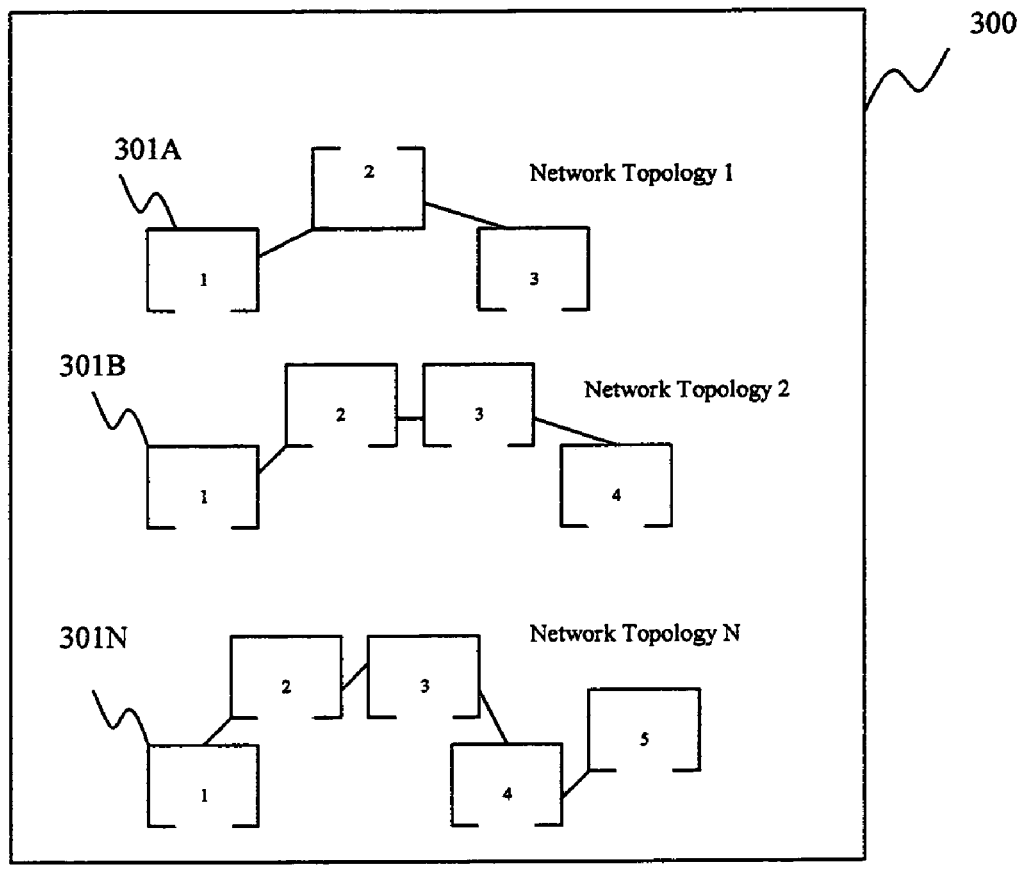
FIG. 3a illustrates a network topology library which contains various supported test scenarios, trigger point information and implementations, and other information needed for the generation of a system test library, as described in details later in this document.
Figure 3B:
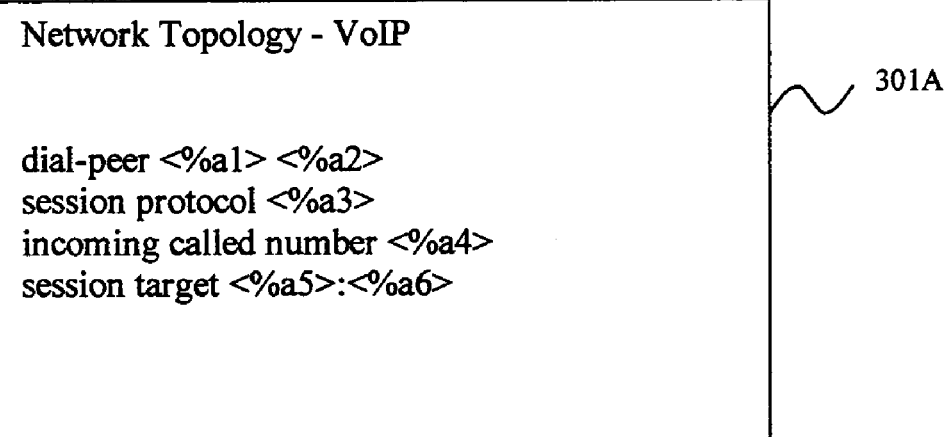
FIG. 3b illustrates a sample system test library command and placeholders for a specific network topology contained in the network topology library.

As illustrated in FIGS. 3a, 3b, and FIG. 4, the network topology library 300 contains a set of network topologies 301A, 301B . . . 301N. Each topology contains a set of test scenarios. Each test scenario consists of a series of abstract commands with placeholders, as illustrated in FIG. 3b, to be replaced with the device attribute values during the generation of the system test library. FIG. 1c illustrates executing an abstract command 112 which goes through a command translation process 111 before the command is actually sent to the device 108. Each network topology library is created for a specific testing scenario. For example, a test scenario under a selected network topology may be provided for Voice Over IP (VoIP) testing of a DUT. The individual commands include placeholders (such as <% a1>). The placeholders are replaced by the parameter/attribute values at the time of the generation of a system test library.

A segment of a sample network topology library:
dial-peer <% a1><% a2>
session protocol <% a3>
incoming called number <% a4>
session target <% a5>:<% a6>

The devices under test are grouped together in a particular configuration to represent a network topology 300 for a given test scenario.

The network topology library captures the configuration for one or more specific test scenarios. For example, the configuration for a voice gateway using SIP could represent one network topology library 301A, 301B . . . 301N where as there will be another library for a voice gateway using H323 protocol FIG. 3a.

Figure 5A:
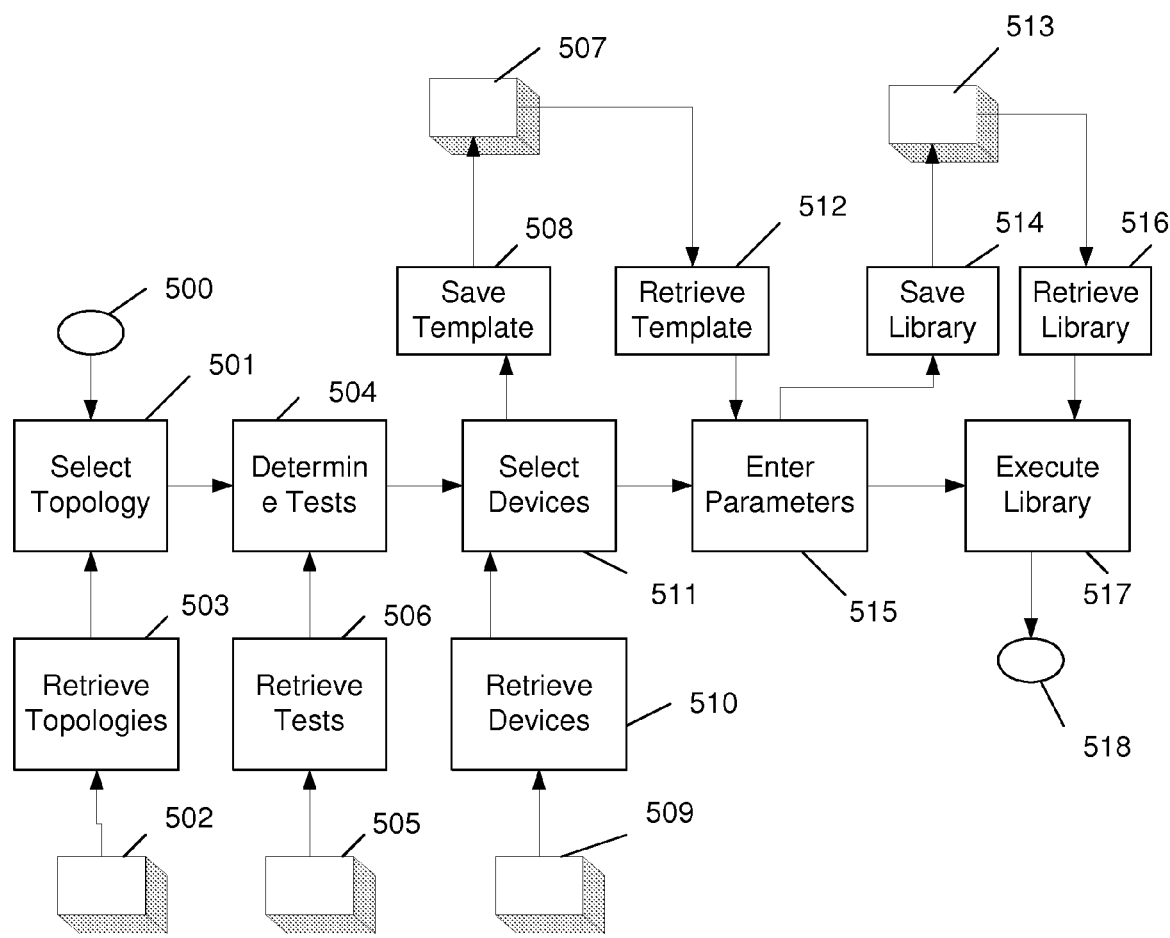
FIG. 5a illustrates a sequence of events and flow of control of the generation of system test library.

On user request 500 as illustrated in FIG. 5a, a command is executed to retrieve all configured network topologies 503 from storage 502. The user then selects a test topology 501 from the available set. Once the topology is selected, a command is executed to retrieve the available test scenarios 506 from storage 505 that can be associated with the selected topology 501. The user then determines the tests 504 to be executed. After the topology is selected, the corresponding entry in each device library for devices under test can be selected 511 after requesting the set of available devices that can be tested in the selected topology under selected test scenarios from storage 509. When the devices under test are selected, the user has an option to save the work as a template 508, in a local or remote storage 507 which can be retrieved later 512. The user is prompted for the values of the device parameters 515. The system test library is generated and optionally, on request 514, the generated library can be saved in local or remote storage 513 for later retrieval 516. The retrieved or currently active library can then be executed 517 and the results displayed 518 or transmitted to an external location.

User Interface and Trigger Points

Figure 6:
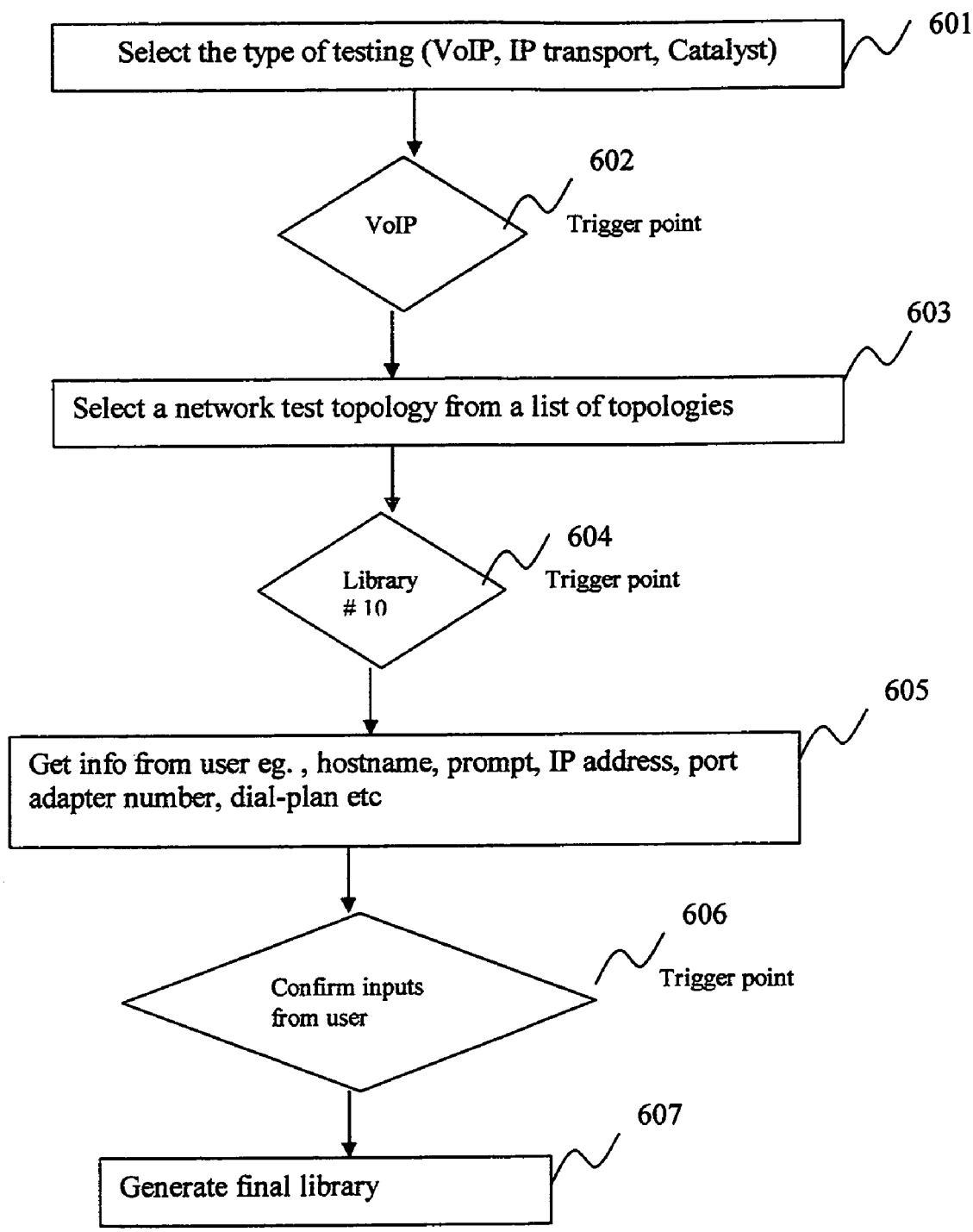
FIG. 6 illustrates flow of control including invocations of trigger points.
Figure 7:
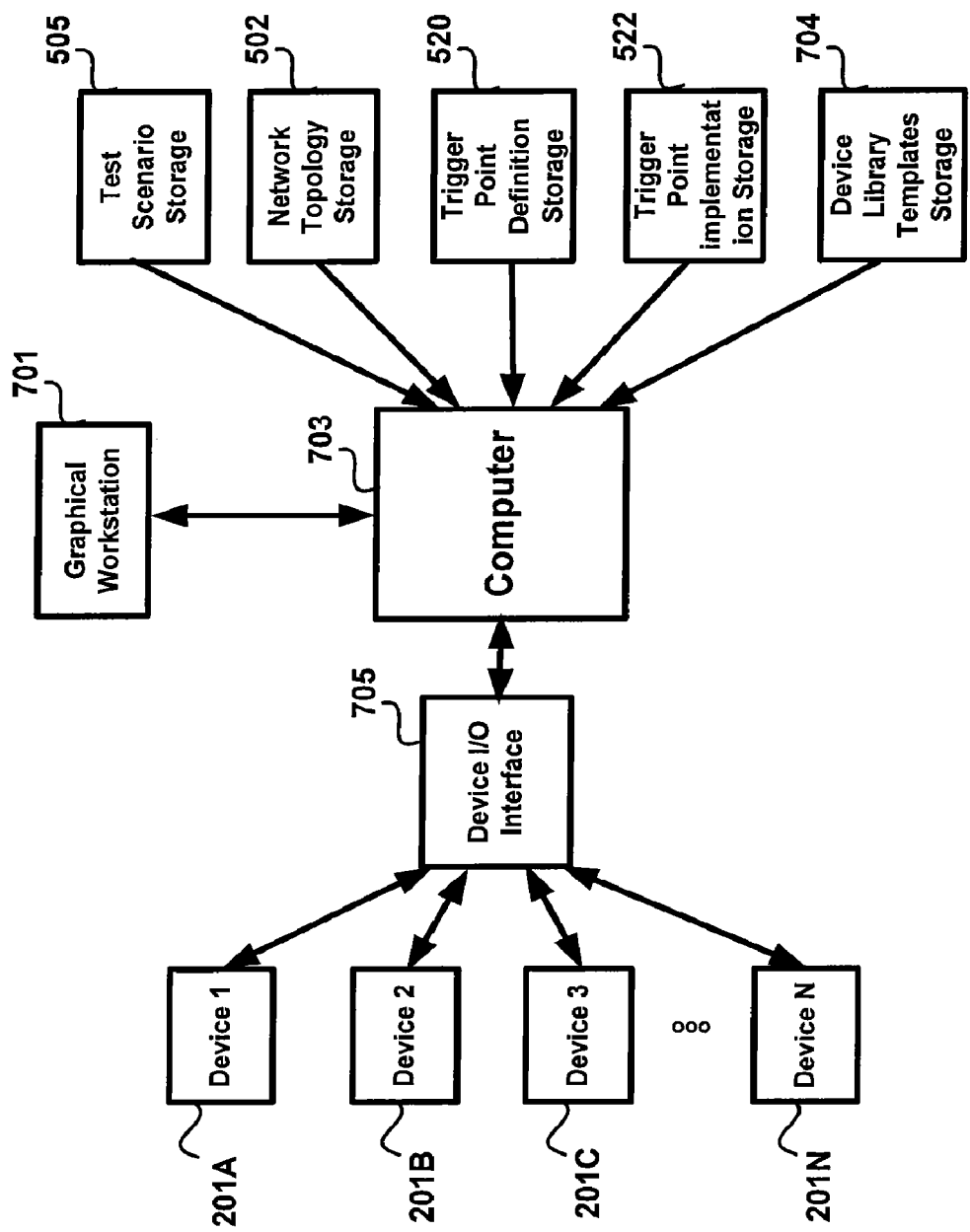
FIG. 7 illustrates an embodiment of apparatus.

A unified graphical user interface 402 guides a user in selecting and supplying the necessary configuration information for a device with respect to a specific network topology. As illustrated in FIG. 6 the user interface works on a layered approach 601,603,605,607 with trigger points 602,604,606 in each layer leading to the next layer. In other words, subsequent user interaction 603 depends on the selection of trigger point made by the user in a previous user interaction 601. The selected trigger point is executed and the next user interaction is calculated. Multiple trigger points can be made available in each layer. A trigger point is executed based on the topology, device, configuration, and the information provided by the user in the preceding user interaction.

FIG. 6 shows operations of different layers of the user interface. FIG. 6 also shows the trigger point activation in one layer and the flow to the next layer. Select the type of testing (for example: VoIP, IP transport, Catalyst) 601. For example, select a network topology from the list of available network topologies corresponding to the type of testing 602. Once the topology is selected, the user is asked to select one or more test scenarios. Based on the test scenarios selected, the user is asked to enter or select from given choices the device information (such as, but not limited to, identity of the device which is selected from a list of devices, network interface information, IP address or addresses, prompt information etc.) for all the devices that constitute the test scenarios within the selected network topology 603. The information obtained from the user and the information for the DUT is summarized and displayed for confirmation by the user 604. Once confirmed, system test libraries are generated and stored in a non-volatile memory. The storage could be local or remote accessible via a network 605.

A trigger point refers to a set of conditions that need to be satisfied for an action to happen. A trigger point implementation encompasses a common set of conditions (such as required parameters for a particular test scenario for a particular network topology) independent of the vendor of the device. As mentioned above, a trigger point is implemented as a set of application programming interfaces (API) consisting of actions that are mapped to a set of device dependent set of commands (ex. CLI commands for the device). These mappings may be stored locally, or may reside on a different server. This abstraction of commands enables the generation of a system test library that is independent of the vendor-specific implementation of commands for a given device. Hence, a system test library generated for a specific test scenario can be used to test devices manufactured by different vendors without the need for change in the system test library programming code.

Once the topology, test scenarios, and devices have been selected by the user, the user needs to enter the information associated with the test. The information is entered as a series of trigger points, which in turn can contain more trigger points.

For example, a test topology is defined and the test scenarios and devices are selected. Three devices, A, B, and C are the subject of the test, which in turn require parameters A1, A2, B1, B2, and C1. At the first level, we have a UI which displays information about all of the devices. For this test topology and set of test scenarios, we could have multiple implementations of this screen. On selecting to update the parameters associated with device A, we could have one implementation which encompasses both parameters, or two implementations which define both parameters. And so on for B and C.

The implementations could be as simple as a popup dialog box with a single line prompt which accepts whatever characters the user chooses to enter and moves on. Or it can provide a long explanation, link to help files, check the data entered for range, format, or against a known set of answers, and so on.

The testing system calls a particular implementation of a trigger point based on the user interaction with the system. Various trigger point implementations are stored and are available in the testing framework. For example, when a user selects VoIP mode 602 testing for a specific device wherein the attribute/parameter information of the device is present in the device library 200, the test system prompts the user to choose the values of the attributes and the protocol to use. For example, the user may select a protocol H323, SIP, or, MGCP, three different implementations of a same trigger point. Once the user has selected the protocol, an appropriate trigger point implementation from the network topology library-mapping store is called to configure the desired protocol using the values of attributes provided by the user (or a script). The storage of these mappings could be local or remote.

Figure 5B:
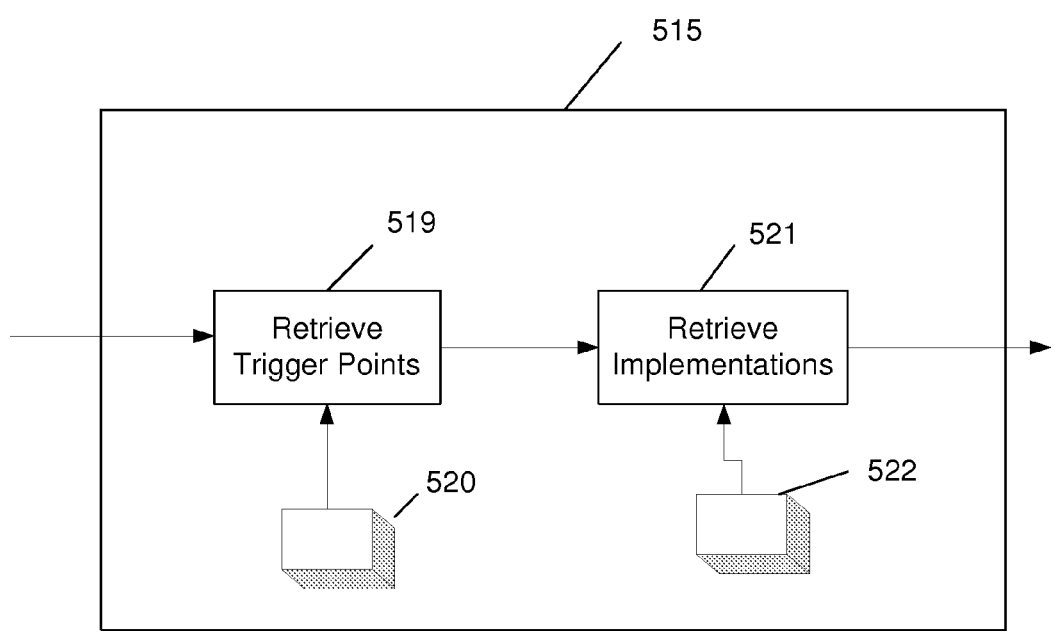
FIG. 5b illustrates a sequence of events and flow of control of the selection of trigger points and their implementations.

For a selected test scenario and a selected device FIG. 5a, the parameter values entered 515 comprise a list of trigger points 519 is retrieved from storage 520, as illustrated in FIG. 5b. For each trigger point, a list of implementations 521 is retrieved from the network topology library-mapping store 522. The testing system presents the list of trigger points and their respective implementations to the user for the selection of desired implementations of the trigger points. Based on these selections, a system test library is generated by replacing the placeholders in the commands. The resulting generated system test library is stored in a media 513 at a preconfigured location or at a location selected by the user.

For example, the parameters/attributes selected by the user and respective values entered:
"dial-peer type=VoIP",
"incoming number=1234",
"VoIP protocol=sip"
"target ip address 10.1.21.156"

will result in the generation of the following segment in the system test library:
dial-peer v 200 VoIP
session protocol sipv2
incoming called number 1234
session target ipv4:10.1.21.156

Another embodiment may provide a script-driven automated selection of desired trigger point implementations, without continuous user interaction, using a preconfigured set of implementation selections for the trigger points and their implementations. This script and associated configuration may be stored locally or on a remote server. The script may be triggered to run either manually or at scheduled time intervals or on the occurrence of a condition requiring system testing.

Another embodiment may provide a script-driven implementation of parameter selection for a pre-stored set of trigger point implementations, without continuous user interactions.

Another embodiment would be a Graphical Workstation 701 interfaced to a computer 703 which controls multiple storage units and a device interface 705 capable of handling the protocols to communicate commands and accept responses from all DUTs 201 A-201 N. Storage, on a computer readable medium, is provided for test scenarios 505, network topologies 502, device libraries 507, trigger point definitions 520, device library templates 704, and trigger point implementations 522, along with storage for scripts which can be associated with any of these.

What is claimed is:

1. A method of generating a system test library at a testing apparatus operably linked to a device under test, for a test scenario, comprising:
    retrieving a list of parameters from a first electronic storage, said list of parameters corresponding to said device under test;
    retrieving parameter values in correspondence to said parameters in said list;
    providing a network topology library to identify a network topology relative to said test scenario and said device under test;
    retrieving trigger points for said identified network topology;
    retrieving trigger point implementations for said trigger points
    retrieving a command set for an identified network topology from a second electronic storage, said command set including command objects; and
    initializing said command objects with said parameter values.

2. The method of claim 1 wherein a script is executed to retrieve said list of parameters.

3. The method of claim 1 wherein a script is executed to retrieve said parameter values.

4. The method of claim 1 further comprising:
    identifying a trigger point implementation.

5. The method of claim 1 further comprising:
    activating said selected trigger point implementation.

6. The method of claim 1 further comprising:
    formatting a user interface of said apparatus for retrieving said list of parameters.

7. A method of generating a device test template at a testing apparatus operably linked to a device under test, for a test scenario, comprising:
    providing a network topology library to identify a network topology relative to said test scenario and said device under test;
    retrieving a command set for an identified network topology, said command set including command objects;
    retrieving trigger points for said identified network topology;
    retrieving trigger point implementations for said trigger points
    storing, to a first computer-readable storage medium operably linked to the apparatus, said device test template;
    generating a system test library for said test scenario for said device under test, including,
        retrieving said device test template from said first computer-readable storage medium;
        retrieving said list of parameters for said device under test from a second computer readable storage medium operably linked to said apparatus;
        retrieving parameter values in correspondence to said parameter in said list of parameters; and
        initializing said command objects with said parameter values.

8. The method of claim 7 wherein a script is executed to retrieve said list of parameters.

9. The method of claim 7 wherein a script is executed to retrieve said parameter values.

10. The method of claim 7 further comprising:
    identifying a trigger point implementation.

11. The method of claim 10 further comprising:
    activating said selected trigger point implementation.

12. The method of claim 11 further comprising:
    formatting a user interface of the apparatus for retrieving said list of parameters.

13. A test controller apparatus for generating a system test library relative to a device under test operably linked thereto via a network, for a test scenario, comprising:
    a data processor configured with an instruction set to generate the test library and perform testing of the device under test in accordance with the test library;
    a network interface, responsive to the data processor to retrieve a list of parameters from a first electronic storage, the list of parameters corresponding to a predetermined device under test;
    a graphical user interface, responsive to the data processor to present the parameters in said list;
    a parameter retrieval interface responsive to the data processor, configured to retrieve parameter values in correspondence to said parameters in said list, configured to access a network topology library to identify a network topology relative to the test scenario and the predetermined device under test, configured to retrieve trigger points for the identified network topology, configured to retrieve trigger point implementations for said trigger points, configured to retrieve a command set for an identified network topology from a second electronic storage including command objects, and initialize the command objects with the parameter values.

14. A computer readable storage medium encoded with computer program instructions which cause a computer to implement a method of generating a test library at a testing apparatus operably linked to a device under test, for a test scenario, the method comprising:
    retrieving a list of parameters from a first electronic storage, said list of parameters corresponding to said device under test;
    retrieving parameter values in correspondence to said parameters in said list;
    providing a network topology library to identify a network topology relative to said test scenario and said device under test;
    retrieving trigger points for said identified network topology;
    retrieving trigger point implementations for said trigger points;
    retrieving a command set for an identified network topology from a second electronic storage, said command set including command objects; and
    initializing said command objects with said parameter values.

15. A test controller apparatus for generating a system test library relative to a device under test operably linked thereto via a network, for a test scenario, comprising:

means for generating the test library and perform testing of the device under test in accordance with the test library;

a network interface, responsive to the means for generating to retrieve a list of parameters from a first electronic storage, the list of parameters corresponding to a predetermined device under test;

a graphical user interface, responsive to the means for generating to present the parameters in said list;

means for retrieving a parameter responsive to the means for generating, for retrieving parameter values in correspondence to said parameters in said list, for accessing a network topology library to identify a network topology relative to the test scenario and the predetermined device under test, for retrieving trigger points for the identified network topology, for retrieving trigger point implementations for said trigger points, for retrieving a command set for an identified network topology from a second electronic storage including command objects, and for initializing the command objects with the parameter values.

* * * * *